(12) United States Patent
Kometani et al.

(10) Patent No.: US 7,034,424 B2
(45) Date of Patent: Apr. 25, 2006

(54) PERMANENT MAGNETIC ROTATING MACHINE

(75) Inventors: Haruyuki Kometani, Tokyo (JP); Shinichi Yamaguchi, Tokyo (JP); Tomohiro Kikuchi, Tokyo (JP); Takashi Tamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/875,621

(22) Filed: Jun. 25, 2004

(65) Prior Publication Data

US 2005/0012419 A1 Jan. 20, 2005

(30) Foreign Application Priority Data

Jun. 27, 2003 (JP) ............................ P 2003-184351

(51) Int. Cl.
*H02K 21/12* (2006.01)

(52) U.S. Cl. ................................. 310/156.47
(58) Field of Classification Search ................ 310/216, 310/217, 254, 156.47, 156.43
See application file for complete search history.

(56) References Cited

U.S. PATENT DOCUMENTS

| | | | | | |
|---|---|---|---|---|---|
| 5,220,228 | A | * | 6/1993 | Sibata | 310/254 |
| 5,942,873 | A | * | 8/1999 | Nakano | 318/702 |
| 6,462,452 | B1 | | 10/2002 | Nakano et al. | |
| 6,657,349 | B1 | * | 12/2003 | Fukushima | 310/156.47 |
| 6,853,105 | B1 | * | 2/2005 | Nakano et al. | 310/156.47 |
| 2003/0048017 | A1 | | 3/2003 | Nakano et al. | |

FOREIGN PATENT DOCUMENTS

| | | |
|---|---|---|
| JP | 5168181 | 7/1993 |
| JP | 2000308286 | 11/2000 |

* cited by examiner

*Primary Examiner*—Tran Nguyen
(74) *Attorney, Agent, or Firm*—Leydig, Voit & Mayer, Ltd.

(57) ABSTRACT

A permanent magnet rotating machine includes a rotor with a permanent magnet having circumferential magnetic poles with a skew at boundaries between magnetic poles of the permanent magnet, and a stator having a stator iron core in an almost cylindrical shape and convex poles protruding inwardly, the rotor being disposed within the stator. A skew angle of the skew is smaller than a theoretical angle $\theta_s$ (electrical angle) and larger than one-half the theoretical angle $\theta_s$, wherein the theoretical angle $\theta_s$ is defined as, $\theta_s$=180×(number of magnetic poles in the rotor)/ smallest integer of which both the number of magnetic poles in the rotor and the number of magnetic poles in the stator are factors) [deg.].

2 Claims, 8 Drawing Sheets

PERMANENT MAGNETIC ROTATING MACHINE

BACKGROUND OF THE INVENTION

1. Field of the Invention

This invention relates to a permanent magnet rotating machine such as a servo motor, and more particularly to a permanent magnet rotating machine of small size and high output power in which the cogging torque is reduced.

2. Description of the Related Art

In the typical constitution of a permanent magnet rotating machine, a rotor is disposed inside a stator. The stator includes a plurality of magnetic poles with a plurality of stator windings on the inner circumference of a stator iron core that is almost cylindrical in shape and a plurality of convex poles protruding inwardly. The rotor has a rotor iron core disposed to be rotatable around a center of the stator as a central axis of rotation. A permanent magnet is located on the surface or inside of the rotor iron core, and magnetized so that N poles and S poles are arranged alternately in a circumferential (rotational) direction. In this rotating machine, the stator windings are appropriately energized to generate a rotational magnetic field so that the rotor is rotated around the central axis of rotation.

In the above permanent magnet rotating machine, a rotational torque ripple called a cogging torque occurs even in the absence of a load. The cogging torque produces a vibration or noise, or degrades the control performance of the rotating electric machine.

To reduce this cogging torque, it is well known to provide a skew at the boundary lines between magnetic poles of the permanent magnet. Generally, the interpole between N pole and S pole of the permanent magnet is a linear space oblique to the central axis of rotation. A theoretical skew angle α (mechanical angle) for reducing the cogging angle most greatly is $\alpha$=360/(smallest integer of which both the number of windings and the number of magnetic poles on the stator side are factors)[deg](refer to JP-A-2000-308286).

If this theoretical skew angle is represented in electrical angle in terms of the number of magnetic poles (poles) of the rotor and the number of magnetic poles (slots) of the stator, the theoretical skew angle $\theta_s$ for reducing the cogging torque most greatly is given by $\theta_s$=180×(number of magnetic poles of the rotor)/ (smallest integer of which both the number of windings of the rotor and the number of magnetic poles of the stator are factors)[deg]  (1)

SUMMARY OF THE INVENTION

When the theoretical skew angle $\theta_s$ (electrical angle) is theoretically decided in the above way, and applied to the actual rotating machine, reduction of the cogging torque may be still insufficient. Its reason is that a leakage flux occurs in the axial (central axis of rotation) direction by employing the skew, but the influence of magnetic saturation due to this leakage flux is not considered.

On the other hand, the permanent magnet rotating machine is required to have a small size and higher output density, and reduce the physical dimensions at the same output. To reduce the physical dimensions, the electric or magnetic loading is required to increase. But if the electric loading is increased, more heat is generated in the windings, giving rise to a high possibility that the continuous rating conditions are not satisfied due to elevated temperatures, whereby it is difficult to achieve the small size and higher output density by increasing the electric loading. Therefore, it is desired to achieve the small size and higher output density by increasing the magnetic loading, or magnetic flux density.

It is an object of the invention to provide a permanent magnet rotating machine capable of making higher output density by increasing the magnetic flux density while making the cogging torque smaller than at the theoretical skew angle.

The present invention provides a permanent magnet rotating machine comprising a rotor with a permanent magnet having a plurality of magnetic poles circumferentially and provided with a skew at the boundary line between the magnetic poles in the permanent magnet, and a stator having a stator iron core of an almost cylindrical shape and formed with a plurality of convex poles protruding inwardly, the rotor being disposed with the stator, characterized in that an upper limit value of a skew angle is smaller than a theoretical angle $\theta_s$ (electrical angle) and a lower limit is larger than half the theoretical angle $\theta_s$, wherein the theoretical angle $\theta_s$ is defined as, $\theta_s$=180×(number of magnetic poles in the rotor)/ (least common multiple of the number of magnetic poles in the rotor and the number of magnetic poles in the stator) [deg.]

DETAILED DESCRIPTION OF THE PREFFERED EMBODIMENT

Embodiment 1

Figure 1:
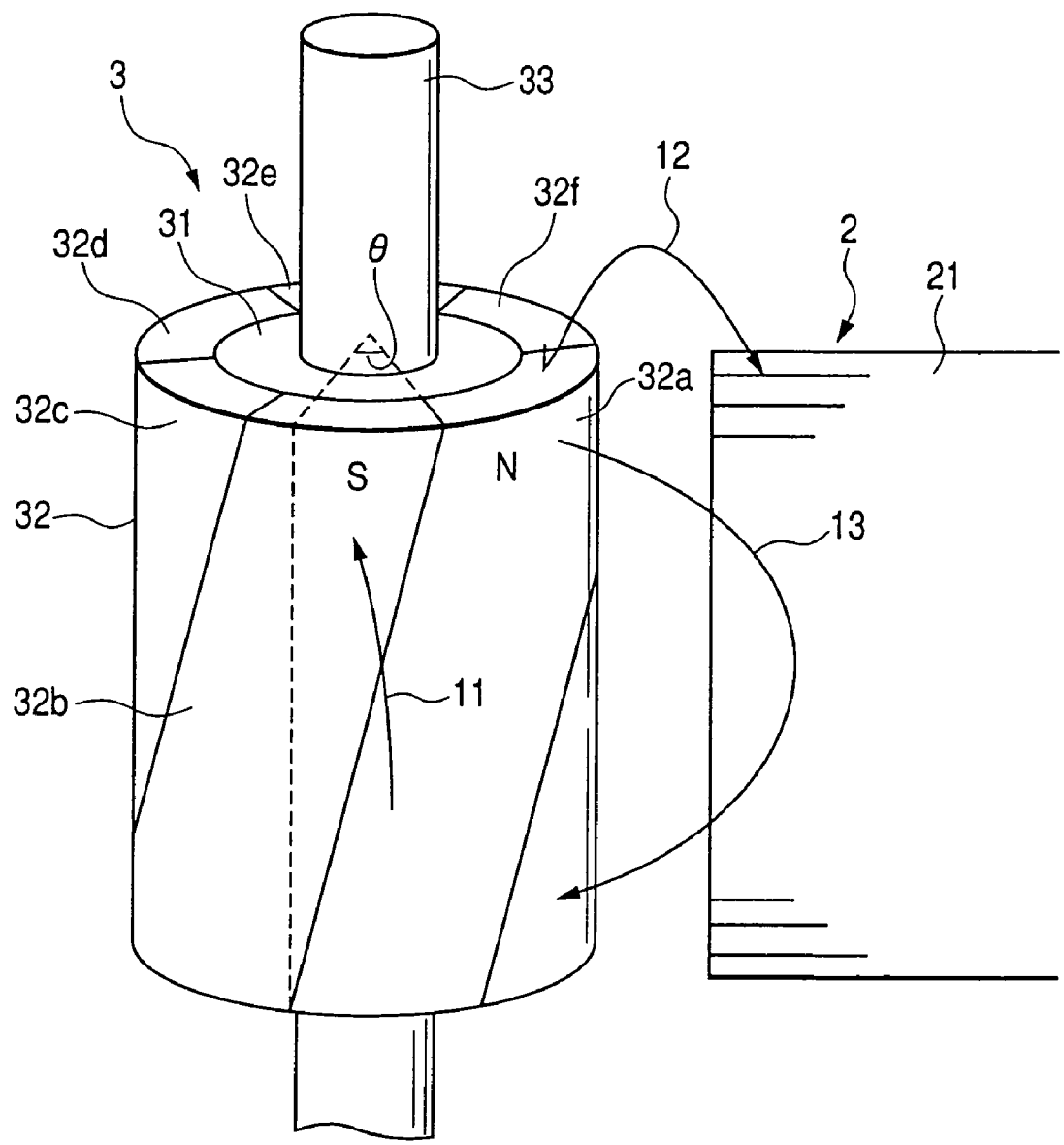
FIG. 1 is a perspective view showing the essence of a permanent magnet rotating machine according to an embodiment 1 of the present invention.
Figure 2:
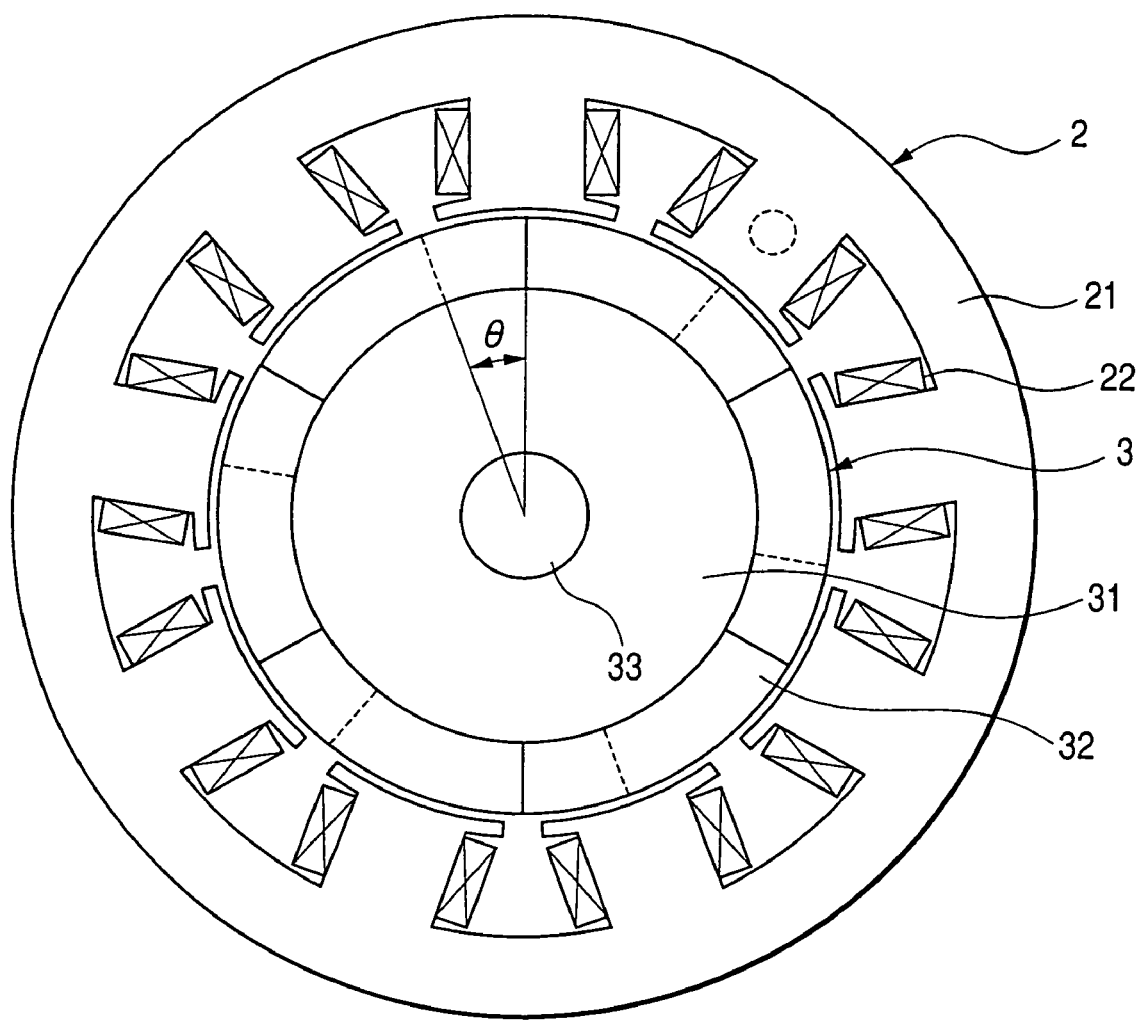
FIG. 2 is a plan view showing the permanent magnet rotating machine according to the embodiment 1 of the invention.

FIGS. 1 and 2 show a permanent magnet rotating machine according to an embodiment 1 of the present invention. Specifically, FIG. 1 is a perspective view showing the essence of the permanent magnet rotating machine and FIG. 2 is a plan view.

As shown in FIGS. 1 and 2, a rotor 3 has a permanent magnet 32 disposed on the outer circumferential face of a rotor iron core 31 secured to a rotor shaft 33. The permanent magnet 32 has the magnetic poles 32a to 32f magnetized so that N poles and S poles are arranged alternately in the circumferential (rotational) direction, with a skew (skew angle θ) provided at the boundary line between magnetic poles 32a and 32b, 32b and 32c, 32c and 32d, 32d and 32e, 32e and 32f, and 32f and 32a. In FIG. 2, the number of magnetic poles of the rotor 3 is 6.

Also, the stator 2 has a plurality of magnetic poles formed by providing a plurality of stator windings 22 on the inner circumference of a stator iron core 21 of almost cylindrical shape and formed with a plurality of convex poles (teeth) protruding inwardly. In FIG. 2, the number of magnetic poles (slots) of the stator 2 is 9.

The rotor 3 has a rotor iron core 31 disposed rotatably around a center of the stator 2 as a central axis of rotation, in which the stator windings 22 are appropriately energized to generate a rotational magnetic field so that the rotor 3 is rotated around the central axis of rotation.

In this embodiment, the theoretical skew angle $\theta_s$ (electrical angle) is represented from the above expression (1) as $$\theta_s = 180 \times (\text{number of magnetic poles of the rotor})/(\text{least common multiple of the number of magnetic poles of the rotor and the number of magnetic poles of the stator})$$

$$= 180 \times 6/18 = 60[\text{deg}]$$

wherein the skew angle θ (electrical angle) of the rotor 3 is smaller than the theoretical skew angle of 60°, and larger than half the theoretical skew angle of 30°.

First of all, a cogging torque occurrence mechanism will be formulated in a two-pole three-slot salient pole permanent magnet rotating machine with concentrated windings in which the number of magnetic poles of the rotor is 2 and the number of magnetic poles of the stator is 3, as an example.

It is known that the cogging torque occurs mainly due to interaction between stator slot harmonics (associated with air-gap permeance variations caused by stator slot grooves) and rotor magnetomotive force harmonics (because magnetomotive force waveform of magnet is deviated from the sinusoidal wave).

Also, the influence of magnetic saturation on the cogging torque is considered as the interaction between stator slot harmonics and harmonics due to magnetic saturation. Generally, since the principal components of harmonics due to magnetic saturation have the same order as the rotor magnetomotive force harmonics, the harmonics due to magnetic saturation are included in the rotor magnetomotive force harmonics for the simple explanation.

Herein, in the case of the ring-like magnet 32 magnetized radially, the magnetomotive force of magnet has a rectangular waveform for the magnetomotive force harmonics of the rotor 3. Therefore, the even-order harmonics are canceled, and the odd-order harmonics only appear. Since the air-gap magnetic flux density $B_r$ produced by the rotor magnetomotive force is principally calculated by the product of rotor magnetomotive force harmonics and smooth permeance, the air-gap magnetic flux density $B_r(Z)$ produced by the rotor magnetomotive force harmonics is expressed in the following manner. However, the following formula represents the air-gap magnetic flux density in z coordinate, when the z coordinate is taken along the axial direction.

[Formula 1] (2)

$$B_r(z) = \sum_n A_n(z)\cos\{n\alpha - n\omega t + \psi_n\}$$

$$n = 4m \pm 1$$

Where n: order of harmonics $A_n(z)$: amplitude value of nth-order harmonic magnetic flux density in z coordinate α: spatial angle of rotating machine ω: fundamental angular frequency t: time m: any integer with which the order of space harmonics is not negative $\psi_n$: initial phase of nth-order harmonic Also, the air-gap magnetic flux density $B_s(z)$ in z coordinate due to slot harmonics of the stator 2 is calculated principally by slot permeance harmonics×fundamental magnetomotive force, and expressed by the following formula.

[Formula 2] (3)

$$B_s(z) = \sum_i S_i(z)\cos\{i\alpha - (\pm \varpi t) + \phi_i\}$$

$i = N_s j \pm 1$ (double signs in same order)

Where i: order of harmonics $N_s$: number of slots of the stator $S_i(z)$: amplitude value of ith-order harmonic magnetic flux density in z coordinate j: any integer with which the order of space harmonics is not negative $\phi_i$: initial phase of ith-order harmonics Of course, if the number of poles (number of magnetic poles of the rotor 3) is an integral multiple of two, the order of space harmonics is multiplied by the number of pole pairs to attain the same expression, whereby the generality is not lost in terms of the number of poles. Also, the coefficient of j is only changed in terms of the number of slots (number of magnetic poles of the stator 2), whereby the generality is not lost. Hence, the two-pole three-slot machine will be described below.

Firstly, a skew magnetization of the permanent magnet 32 will be formulated. The skew magnetization means that the phase of magnetomotive force of the rotor 3 is changed axially. Considering this influence in the expressions (2) and (3), the skew magnetization is expressed by the following formula.

[Formula 3]

$$B_r(z) = \sum_n A_n(z)\cos\{n\alpha - n\varpi t + \psi_n + n\delta(z)\} \quad (4)$$
$$n = 4m \pm 1$$

$$B_s(z) = \sum_i S_i(z)\cos\{i\alpha - (\pm \varpi t) + \phi_i = \delta(z)\} \quad (5)$$
$$i = 3j \pm 1 \text{ (double signs in same order)}$$

Herein, $\delta(z)$ is the phase changing axially due to skew.

The cogging torque occurs due to interaction of the harmonics indicated by the expressions (4) and (5), and is examined by calculation of expression (4)×expression (5).

The cogging torque is not a partial electromagnetic force, but represented as an integral value of electromagnetic force around the rotating machine. Therefore, if the order of space harmonics is not zero, the integral value around the rotating machine is necessarily zero, so that the cogging torque is zero. Hence, it is only necessary to examine the combinations of harmonics in which the order of space harmonics is zero among the harmonics calculated by expression (4)× expression (5).

Though there are a great number of combinations where the order of space harmonics is zero, the cogging torque tends to be greater with the component of smaller order. Also, any combination of harmonics with equal frequency (temporal harmonics) may be employed without changing the expression. Herein, an instance of m=1 with + sign after m and j=2 with − sign after j is considered here. In this case, the orders of space harmonics in the expressions (4) and (5) are both 5 (fifth order space harmonics), and the order of space harmonics can be zero by multiplication of them.

The cogging torque C when the order of space harmonics is zero is expressed by the following formula.

$$C \propto \int_0^l A(z)\cos\{6\varpi t - 6\delta(z) + \gamma\}dz \quad (6)$$

Herein, A is a constant proportional to the square of magnetic flux density, in which there is an axial distribution due to axial magnetic flux caused by skew. Where l is the length of iron core, and γ is initial phase.

The cogging torque due to magnetic saturation is also expressed by exactly the same formula.

$$C \propto \int_0^l D(z)\cos\{6\varpi t - 6\delta(z) + \xi\}dz \quad (7)$$

Herein, D is a constant proportional to the square of magnetic flux density, in which there is an axial distribution due to axial magnetic flux caused by skew. Where ξ is initial phase.

Herein, since the coefficient before ωt in the expressions (6) and (7) is 6, the main component of cogging torque is 6f (f: fundamental frequency).

Though the sum of cogging torque in the expressions (6) and (7) is approximate to the actual cogging torque, it will be easily found that if A(z) and D(z) are constant values without axial distribution, the cogging torque of 6f component is most greatly reduced at the theoretical angle of 60°.

However, if A(z) and D(z) have any axial distribution, it is considered that the cogging torque is smaller in the axial central part where the cogging torque caused by magnetomotive force harmonics and the cogging torque due to magnetic saturation cancel each other in the phase.

Herein, the axial magnetic flux occurring in the motor will be described below. The magnetic flux generated by the permanent magnet 32 may possibly flow axially if there is any skew. That is, there are a magnetic leakage flux leaking axially at interpole on the surface of the rotor 3 (indicated by the arrow 11 in FIG. 1), an axial magnetic leakage flux at the end portion (indicated by the arrow 12 in FIG. 1) and a magnetic leakage flux flowing axially through the teeth of the stator and entering the rotor (indicated by the arrow 13 in FIG. 1, hereinafter referred to as a tooth end magnetic leakage flux).

In practice, for a permanent magnet rotating electric machine of six-pole nine-slot (the number of magnetic poles of the rotor is 6 and the number of magnetic poles of the stator is 9), with the outputs of 50 W, 100 W, 200 W, 400 W and 750 W, the three dimensional electromagnetic analysis was made in consideration of the axial magnetic leakage flux (arrows 11 to 13), using the parameter of the magnetic flux density (maximum value at the unloaded time) in the central part of teeth in the stator 2. As a result, the axial distributions of cogging torque having the magnitude as shown in FIGS. 3, 4, 5, 6 and 7 were obtained. The comparisons are shown in the following.

Figure 3:
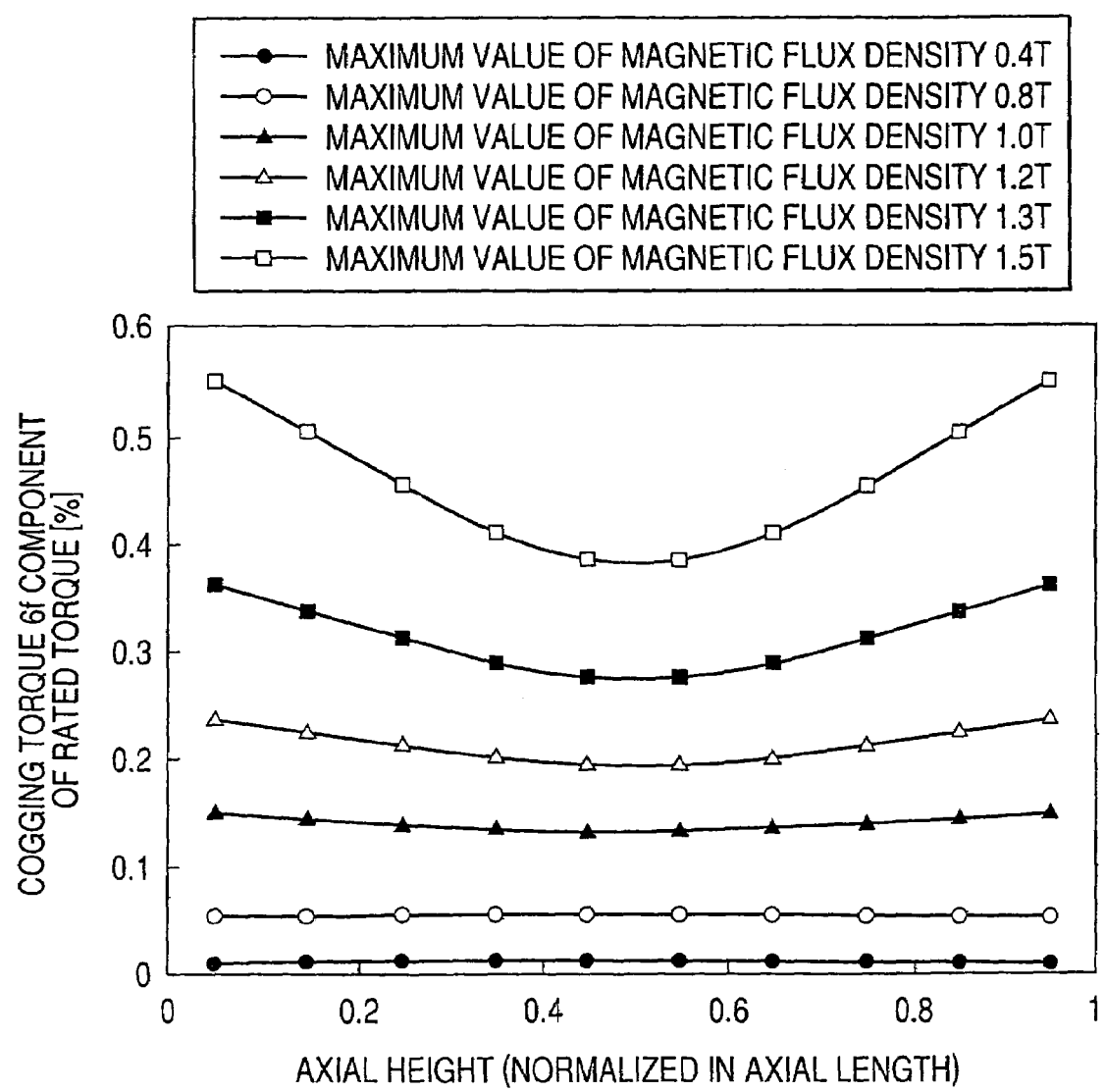
FIG. 3 is a relational view showing an axial distribution of the magnitude of cogging torque with a parameter of the magnetic flux density (maximum value at unloaded time) in a central part of stator teeth in the permanent magnet rotating machine having an output of 50 W.
Figure 4:
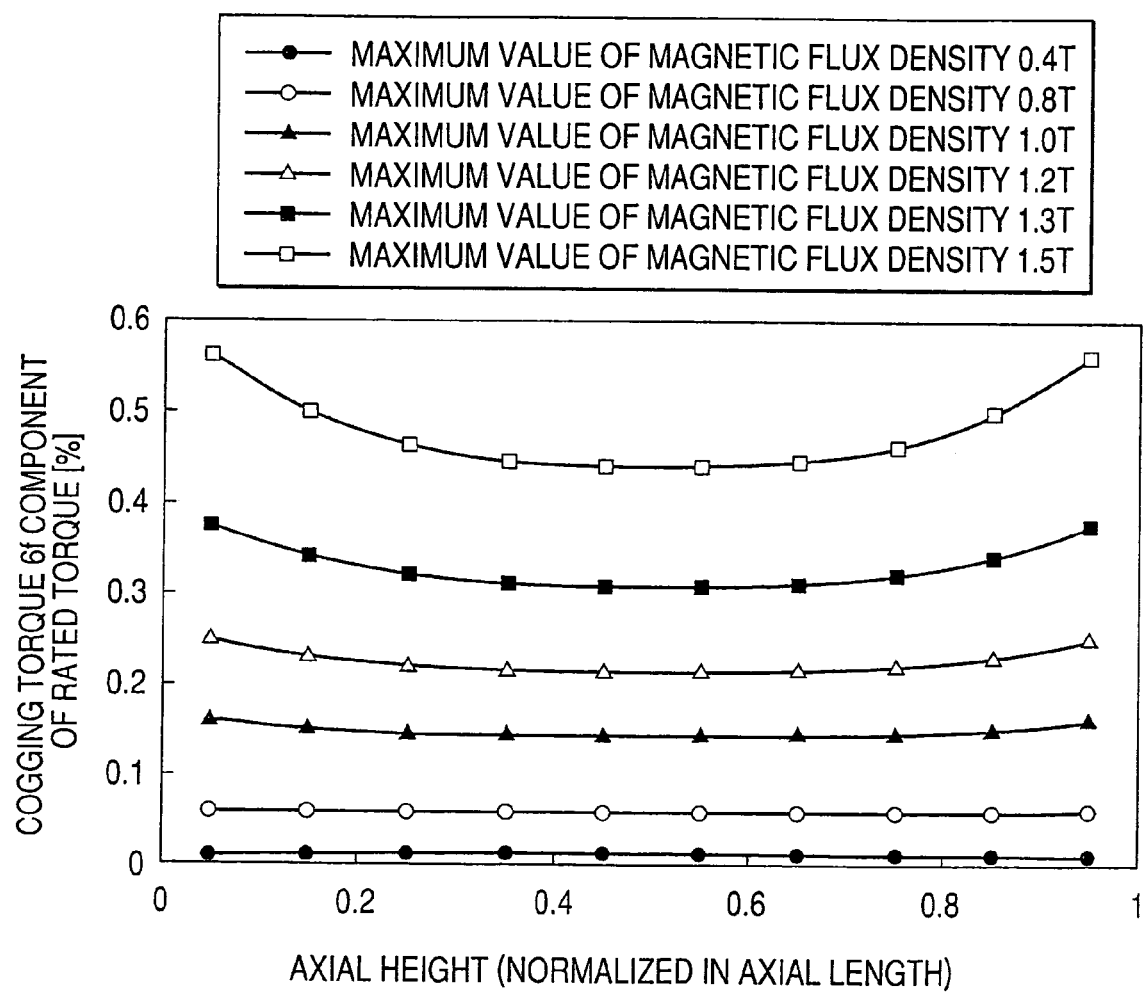
FIG. 4 is a relational view showing an axial distribution of the magnitude of cogging torque with a parameter of the magnetic flux density (maximum value at unloaded time) in the central part of stator teeth in the permanent magnet rotating machine having an output of 100 W.
Figure 5:
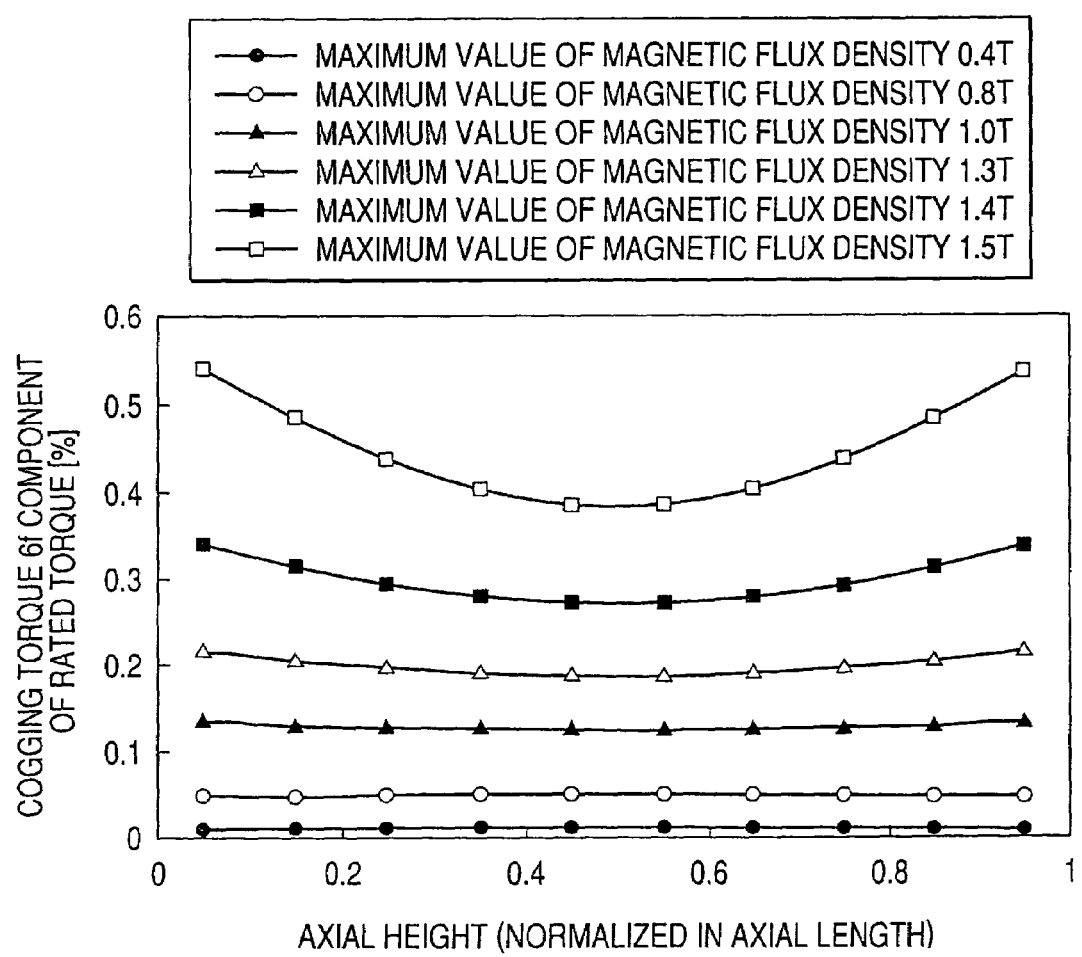
FIG. 5 is a relational view showing an axial distribution of the magnitude of cogging torque with a parameter of the magnetic flux density (maximum value at unloaded time) in the central part of stator teeth in the permanent magnet rotating machine having an output of 200 W.
Figure 6:
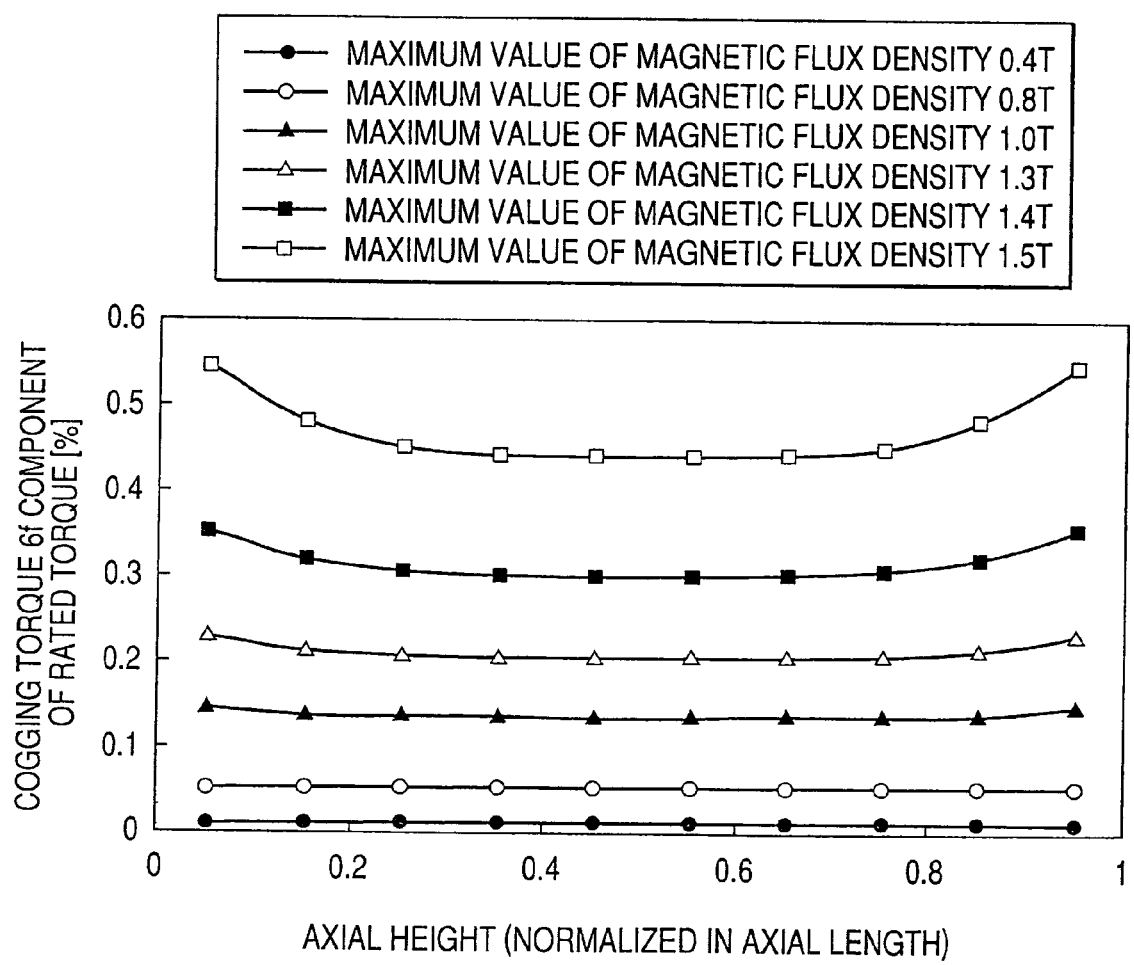
FIG. 6 is a relational view showing an axial distribution of the magnitude of cogging torque with a parameter of the magnetic flux density (maximum value at unloaded time) in the central part of stator teeth in the permanent magnet rotating machine having an output of 400 W.
Figure 7:
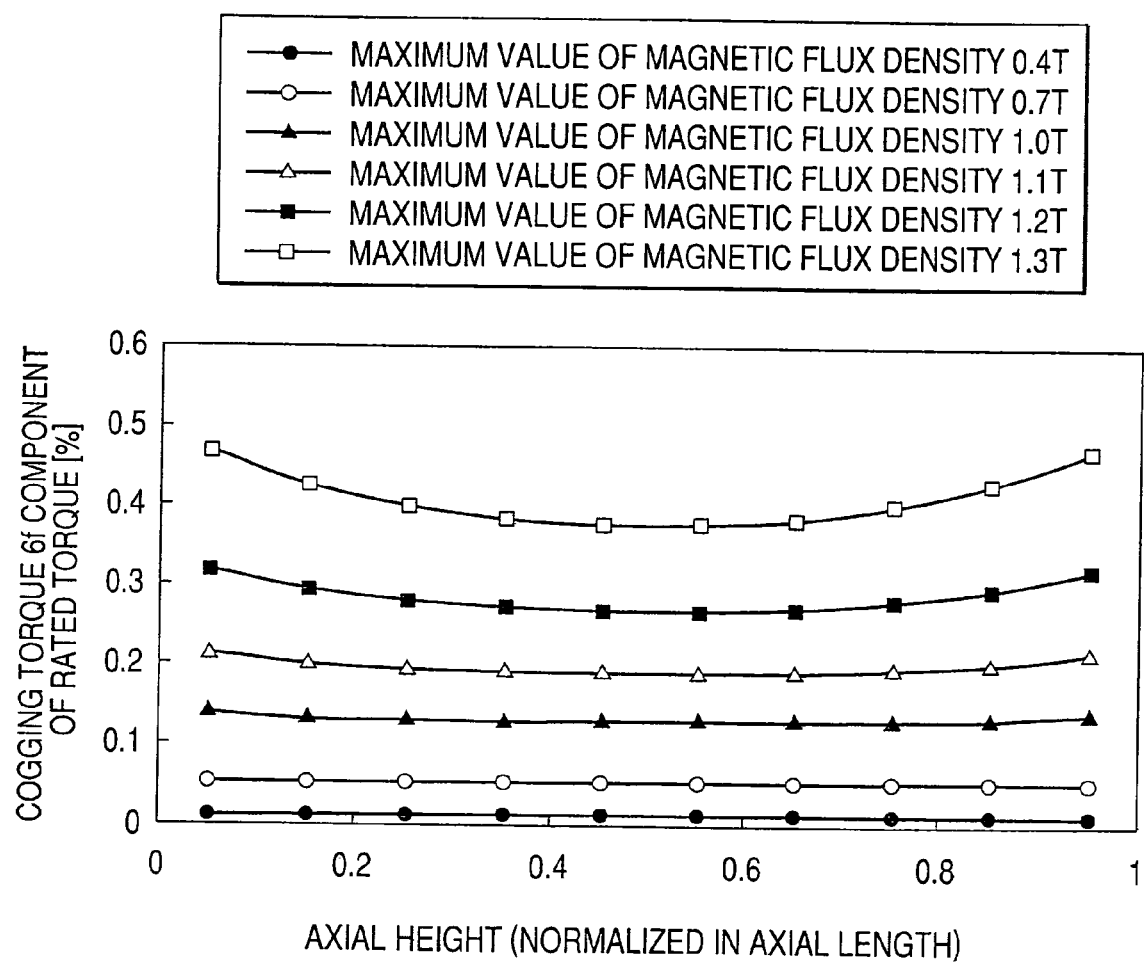
FIG. 7 is a relational view showing an axial distribution of the magnitude of cogging torque with a parameter of the magnetic flux density (maximum value at unloaded time) in the central part of stator teeth in the permanent magnet rotating machine having an output of 750 W.

In FIGS. 3 to 7, the transverse axis is the axial height of the rotor 3 normalized by the axial length of the rotor 3, and the longitudinal axis is the percentage of cogging torque 6f component to the rated torque (approximate value of the sum of vector A(z) and vector D(z)). In FIGS. 3 and 4, black circle symbol (●) indicates the result when the maximum value of magnetic flux density in the central part of teeth is 0.4 T, white circle symbol (○) when it is 0.8 T, black triangle symbol (▲) when it is 1.0 T, white circle symbol (△) when it is 1.2 T, black rectangle symbol (■) when it is 1.3 T, and white rectangle symbol (□) when it is 1.5 T. Also, in FIGS. 5 and 6, black circle symbol (●) indicates the result when the maximum value of magnetic flux density in the central part of teeth is 0.4 T, white circle symbol (○) when it is 0.8 T, black triangle symbol (▲) when it is 1.0 T, white circle symbol (△) when it is 1.3 T, black rectangle symbol (■) when it is 1.4 T, and white rectangle symbol (□) when it is 1.5 T. Moreover, in FIG. 7, black circle symbol (●) indicates the result when the maximum value of magnetic flux density in the central part of teeth is 0.4 T, white circle symbol (○) when it is 0.7 T, black triangle symbol (▲) when it is 1.0 T, white circle symbol (△) when it is 1.1 T, black rectangle symbol (■) when it is 1.2 T, and white rectangle symbol (□) when it is 1.3 T.

In this invention, the central part of teeth is the area around the axial central part of the stator in the inwardly protruding direction of the teeth, as indicated by a broken line circle in FIG. 2, in which the area around the central part in the inwardly protruding direction is neither the tip end nor the root part of teeth.

Generally, since the cogging torque due to magnetomotive harmonics as indicated by the expressions (6) and (7) and the cogging torque due to magnetic saturation are different in the phase that occurs, the magnetic saturation distribution is different axially, and the cogging torque has axial distribution.

Herein, in the permanent magnet rotating machine with higher output density and higher magnetic flux density, if there is a greater influence due to tooth end leakage flux caused by skew, the magnetic saturation in the axial central part is promoted, so that the cogging torque due to magnetomotive harmonics and the cogging torque due to magnetic saturation are offset in the axial central part, causing a phenomenon that the cogging torque in the central part is smaller than the cogging torque occurring at the end portion, as will be seen from FIGS. 3 to 7.

Also, from FIGS. 3 to 7, the maximum value of magnetic flux density in the central part of teeth of the stator is 1 T or more at the unloaded time. In the permanent magnet rotating electric machine with large magnetic saturation and skew, the cogging torque is smaller in the axial central part and larger at the end portion.

Figure 8:
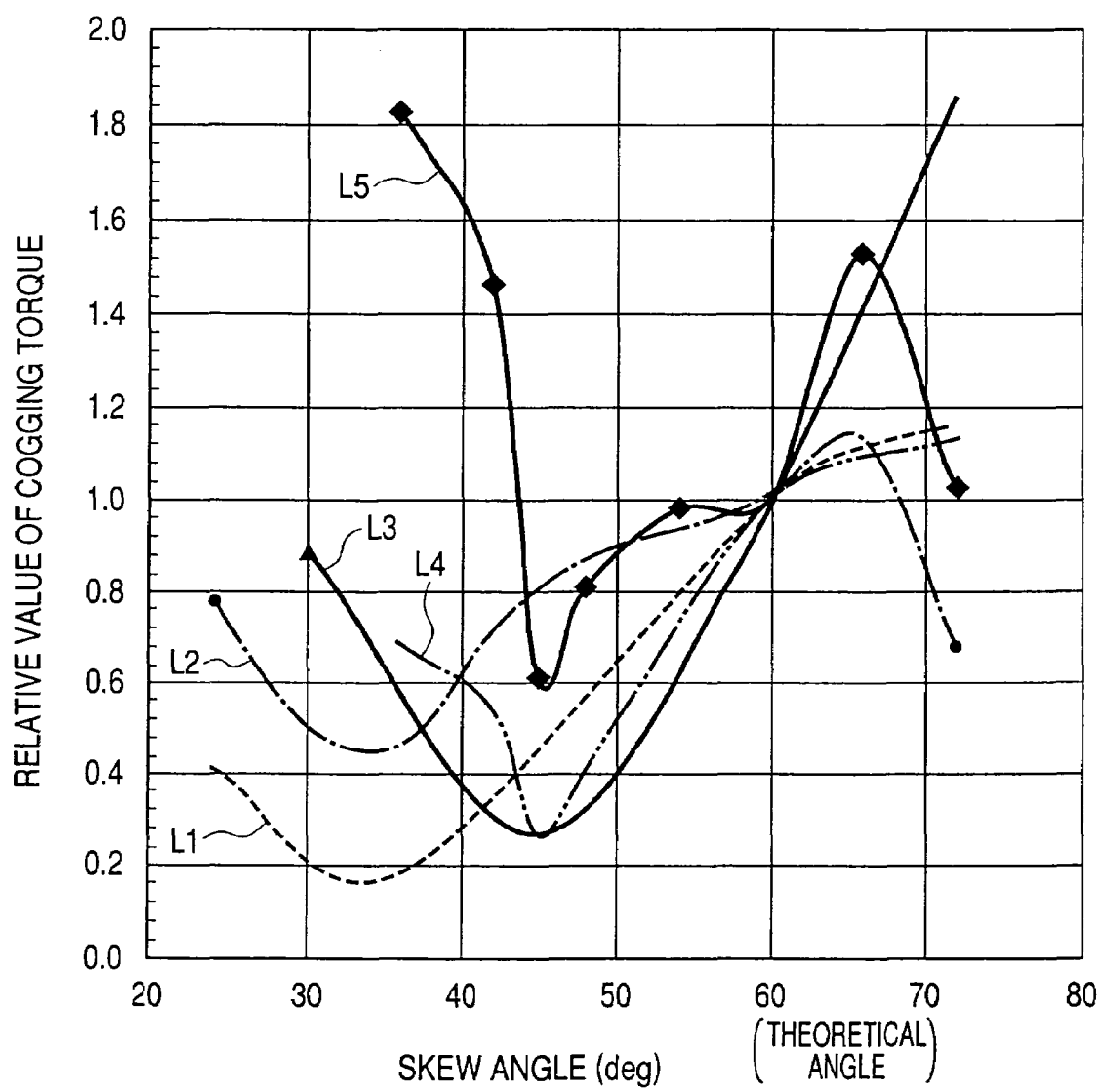
FIG. 8 is a relational view showing the measured results of the magnitude of cogging torque at each skew angle.

In practice, in a plurality of permanent magnet rotating machines having 6-pole 9-slot rotor with a skew, the current conditions meet the continuous rating specification, the cogging torque was measured by changing the skew angle (electrical angle). The results are obtained as shown in FIG. 8. In this case, it was confirmed that the magnetic flux density in the central part of teeth at the unloaded time was from about 1.25 T to 1.35 T by the three dimensional electromagnetic analysis.

In FIG. 8, the transverse axis is the skew angle, in which the theoretical skew angle is 60° because of 6-pole 9-slot. The longitudinal axis is the percentage of measured cogging torque to the cogging torque at the theoretical skew angle as the cogging torque relative value. In FIG. 8, the broken line indicated by sign L1 represents the measured results in the permanent magnet rotating electric machine having an output of 50 W, the one dot chain line indicated by sign L2 represents the measured results in the permanent magnet rotating machine having an output of 100 W, the solid line indicated by sign L3 represents the measured results in the permanent magnet rotating machine having an output of 200 W, the two dot chain line indicated by sign L4 represents the measured results in the permanent magnet rotating electric machine having an output of 400 W, and the solid line indicated by sign L5 represents the measured results in the permanent magnet rotating machine having an output of 750 W.

From FIG. 8, it can be found that in all the permanent magnet rotating machines, the cogging torque is minimum when the skew angle is smaller than the theoretical skew angle 60°, and larger than half the theoretical skew angle 30°.

If the skew angle is smaller, the induced voltage is increased, whereby there is an auxiliary effect that the higher output density is attained.

Though FIG. 8 shows the measured results of the magnitude of cogging torque for the skew angle (electrical angle) when the maximum value of magnetic flux density in the central part of teeth of the stator is from about 1.25 T to 1.35 T at the unloaded time, in the permanent magnet rotating machine in which the maximum value of magnetic flux density in the central part of teeth of the stator is 1 T or more at the unloaded time, there is a remarkable tendency that the cogging torque in the axial central part is smaller, and larger at the end portion, as will be seen from FIGS. 3 to 7. Therefore, at 1 T or more, the same results as in FIG. 8 may be obtained.

In FIGS. 3 to 7, when the maximum value of magnetic flux density in the central part of teeth of the stator is 1 T or more at the unloaded time, there is a remarkable tendency that the cogging torque in the axial central part is smaller, and larger at the end portion. However, the limit value of magnetic flux density may be varied depending on the output of the permanent magnet rotating electric machine, axial length, leakage amount of tooth end magnetic leakage flux, and the numbers of magnetic poles of the rotor and stator.

In the above embodiment, the invention has been applied to the permanent magnet rotating machine in which the ratio of the number of magnetic poles (poles) of the rotor to the number of magnetic poles (slots) of the stator is 2 to 3. In the permanent magnet rotating machine having this ratio of the number of magnetic poles, the least common multiple of the number of magnetic poles of the rotor and the number of magnetic poles of the stator is relatively small, and the cogging torque is larger, whereby it is more effective to select the optimal skew angle. Needless to say, the invention is not limited to the above ratio of the number of magnetic poles, but may be applied to the permanent magnet rotating machine having another ratio of the number of magnetic poles.

Further, the permanent magnet rotating machine having the rotor provided inside the stator has been described in the above embodiment. Needless to say, this invention may be applied to the permanent magnet rotating machine of outer rotor type in which the stator is disposed inside the rotor.

As described above, with the present invention, there is provided a permanent magnet rotating electric machine comprises a rotor with a permanent magnet having a plurality of magnetic poles circumferentially and provided with a skew at the boundary line between the magnetic poles in the permanent magnet, and a stator having a stator iron core of an almost cylindrical shape and formed with a plurality of convex poles protruding inwardly, the rotor being disposed with the stator, characterized in that the upper limit value of a skew angle is smaller than a theoretical angle $\theta_s$ (electrical angle) and the lower limit is larger-than half the theoretical angle $\theta_s$, wherein the theoretical angle $\theta_s$ is defined as, $\theta_s$=180×(number of magnetic poles in the rotor)/ (least common multiple of the number of magnetic poles in the rotor and the number of magnetic poles in the stator) [deg.]

Therefore, the permanent magnet rotating machine having the higher output density can be produced by increasing the magnetic flux density while making the cogging torque smaller than at the theoretical skew angle.

What is claimed is:

1. A permanent magnet rotating machine comprising:

a permanent magnet having a plurality of magnetic poles;

a rotor including the permanent magnet disposed circumferentially on the rotor, the permanent magnet having a skew at boundaries between magnetic poles of the permanent magnet;

a stator iron core having a substantially cylindrical shape and including a plurality of convex poles protruding inwardly; and a stator including the stator iron core, the rotor being disposed inside the stator, wherein a skew angle of the skew is smaller than a theoretical angle $\theta_s$ (electrical angle) and larger than one-half the theoretical angle $\theta_s$, and the theoretical angle $\theta_s$ in degrees is defined as, $\theta_s$=180×(number of magnetic poles in the rotor)/ (smallest integer of which both number of magnetic poles of the rotor and number of magnetic poles of the stator are factors).

2. The permanent magnet rotating machine according to claim 1, wherein the number of magnetic poles of the rotor divided by the number of magnetic poles of the stator is ⅔.

* * * * *